United States Patent [19]

Anderson, III et al.

[11] Patent Number: 4,720,676
[45] Date of Patent: * Jan. 19, 1988

[54] MAGNETOMECHANICAL TRANSDUCER UTILIZING RESONANT FREQUENCY SHIFTS TO MEASURE PRESSURE IN RESPONSE TO DISPLACEMENT OF A PRESSURE SENSITIVE DEVICE

[75] Inventors: Philip M. Anderson, III, Chatham; Jeffrey C. Urbanski, Sparta, both of N.J.

[73] Assignee: Allied Corporation, Morris Township, Morris County, N.J.

[*] Notice: The portion of the term of this patent subsequent to Dec. 1, 2004 has been disclaimed.

[21] Appl. No.: 558,084

[22] Filed: Dec. 5, 1983

Related U.S. Application Data

[63] Continuation-in-part of Ser. No. 548,815, Nov. 4, 1983.

[51] Int. Cl.⁴ .................. G01L 9/10; G01L 9/14; G01B 7/14; G01R 33/00
[52] U.S. Cl. ..................... 324/207; 324/226; 73/735
[58] Field of Search ............. 324/207, 208, 209, 226; 73/DIG. 2, 518, 362.69, 728, 735; 331/157; 310/26; 318/118

[56] References Cited

U.S. PATENT DOCUMENTS 3,706,026 12/1972 Johnson, Jr. et al. ............. 324/209

*Primary Examiner*—Reinhard J. Eisenzopf
*Assistant Examiner*—Walter E. Snow
*Attorney, Agent, or Firm*—Ernest D. Buff; Gerhard H. Fuchs

[57] ABSTRACT

A target adapted for use in a magnetomechanical transducer system is activated by an ac magnetic field and a variable dc bias field to produce a resonant frequency which corresponds to the effective strength of the dc bias field. The target includes an elongated ductile strip of magnetostrictive ferromagnetic material enclosed in a nonmagnetic container in a manner to allow the strip to vibrate freely. The strip has a magnetomechanical coupling factor, k greater than O, where $K = \text{zero}\sqrt{(1 - f_r^2/f_a^2)}$, fr and fa being the resonant and anti-resonant frequencies, respectfully. The system is economical to construct and affords accurate and efficient measurement of pressure via displacements and angles of pressure sensitive devices at locations proximate to or remote from the signal source (target).

13 Claims, 9 Drawing Figures

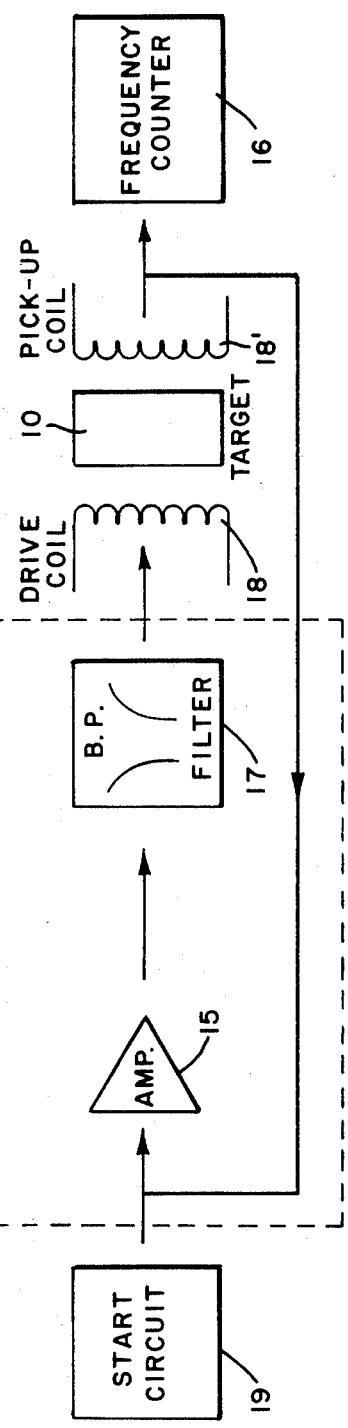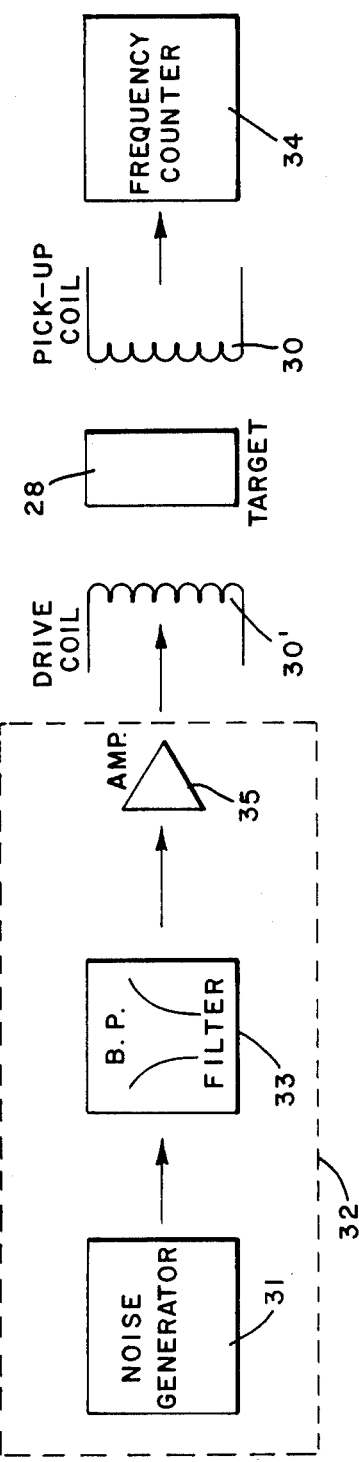

MAGNETOMECHANICAL TRANSDUCER UTILIZING RESONANT FREQUENCY SHIFTS TO MEASURE PRESSURE IN RESPONSE TO DISPLACEMENT OF A PRESSURE SENSITIVE DEVICE

CROSS REFERENCE TO RELATED APPLICATIONS

This application is a continuation-in-part of pending application Ser. No. 548,815 filed Nov. 4, 1983 entitled "Magnetomechanical Transducers Utilizing Resonant Frequency Shifts."

BACKGROUND OF THE INVENTION

1. Field of the Invention

This invention relates to magnetomechanical transducers, that is transducers which utilize magnetomechanical resonant frequency shifts, and more particularly to transducers capable of measuring pressure via displacements and/or rotations of pressure sensitive devices.

2. Description of the Prior Art

Transducers of the type upon which this invention has improved are conventionally used as measurement devices to obtain an electrical signal representative of some physical quantity: for example displacement, speed, pressure and the like. Several of these transducers are presently used to measure displacement and angles.

One type of transducer applies the properties of variable inductance in measuring movement. Variable inductance transducers consist of one or two coils, a core, an armature, an exciter and an induction meter. When a simple single coil is used as a transducer element the mechanical displacement of the armature changes the permeance of the flux path generated by the coil, thereby changing the inductance of the coil. The change in inductance is then measured by suitable circuitry and displayed in appropriate units. The main disadvantage of this transducer is mechanical loading (altered displacements and slower dynamic response) of the signal source resulting from the attachment of the armature mass to the signal source.

Capacitive transducers provide a second method of measuring displacement. Capacitive transducers operate in two modes, changing dielectric constant or changing area. The changing area mode is used in displacement measurements. The changing area is created by shifting capacitor plates in such a way that the effective surface areas of the opposing plates are varied. This creates a change in capacitance which can be measured and correlated to desired units of displacement. The changing dielectric constant is most commonly used in measuring fluid levels. By replacing the vapor between the plates of a capacitor with liquid, the effective dielectric constant can be altered and thus the capacitance will vary with respect to the liquid level. The disadvantages of capacitance systems occur in the area of signal source loading. Capacitors require a closed active circuit to operate, thus the capacitor plate attached to the signal source must have an electrical connection to close the circuit which restricts the motion of the freely moving object in addition to increasing the objects dynamic response time.

Another type of transducer often referred to as a linear variable differential transformer or LVDT provides an ac voltage output proportional to the relative displacement of a transformer core to its windings. The LVDT is a mutual inductance device using three colinear coils and a linearly movable core. The center coil is energized from an external ac power source and the two end coils, connected together in phase, are used as pick-up coils. Output amplitude and phase depend on the relative coupling of the two pick-up coils to the power coil. Relative coupling is in turn dependent on the position of the core. There is a core position for which voltage induced in each of the pick-up coils will be of the same magnitude but opposite in phase, resulting in zero net output. The output voltage magnitudes are ideally the same for equal core displacements on either side of null balance. However, the phase relation existing between the power source and output changes 180 degrees through null. It is therefore possible through phase determination or the use of phase sensitive circuitry to distinguish between outputs resulting from displacements on the two sides of the null. The LVDT offers several distinct advantages over many alternative transducers. First serving as a primary detector-transducer it converts mechanical displacement into a proportional electrical voltage which is a desirable output. The LVDT cannot be overloaded mechanically since the core is completely separable from the rest of the device. It provides a comparatively high output and is reusable, making it one of the most widely used transducers.

The disadvantages of the LVDT are similar to those of the previously described transducers. One disadvantage is that intermediate amplification is required if the output signal is to be transported over a relatively short distance (e.g. more than 5 ft.). The LVDT is limited to relatively linear displacement measurements and short displacement detection range verses overall device length. The LVDT and corresponding measuring devices are expensive to manufacture, thus giving the LVDT transducer system a fairly high cost. In addition dynamic measurements are hindered because the core is of appreciable mass. The exciting frequency of the carrier may also be a limiting factor. The axial force exerted by the core on the signal source is larger when the readily available 60 Hz power source is used than when power source with higher frequencies are used. In addition, the advantage of simple circuitry is lost if the direction from the null must be indicated.

One of the major problems with these transducers is the difficulty of obtaining an accurate measurement without altering or disturbing the system to be measured. These transducers are inefficient in that they require intermediate amplification if a remote reading is required, which results from their sensitivity to amplitude variations in their signals. Another problem with such transducers is the relatively high cost thereof.

SUMMARY OF THE INVENTION

The present invention provides an economic, mechanical transducer system for accurately and efficiently measuring pressure via displacements and/or rotations of pressure sensitive devices at locations proximate or remote from the signal source (target). Generally stated the system comprises a target adapted to be activated by an ac magnetic field and a variable dc magnetic field. The target comprises an elongated ductile strip of magnetostrictive ferromagnetic material enclosed for vibration within a nonmagnetic container. The strip has a magnetomechanical coupling factor k, greater than zero, where $k=\sqrt{(1-fr^2/fa^2)}$ fr and fa being the resonant and antiresonant frequencies respectively. Upon exposure to the ac magnetic field and the variable dc magnetic field, the target produces a resonant frequency that corresponds to the effective strength of the dc bias field, and can be correlated to the angular or linear displacement of pressure sensitive devices associated therewith.

More specifically, the target consists of a ductile strip of magnetostrictive ferromagnetic material that is free to vibrate in a container which is surrounded by two overlapping coils. The coils function as an a.c. magnetic field interrogator and a receiver respectively. The magnetostrictive strip is excited into a mechanical resonance by the interrogating ac magnetic field, provided that the natural resonant frequency of the strip is present in the frequency band of the a.c. field. When the variable amplitude dc magnetic field is applied, the Youngs modulus of the strip is altered ($\Delta E$ effect). The resonant frequency of the strip is related to the Youngs modulus, E, by the equation $fr=(\frac{1}{2}L)(E/D)^{\frac{1}{2}}$ where L=length and D=mass density of the strip. Therefore the resonant frequency changes when the dc magnetic field changes. The dc magnetic field strength varies in accordance with the distance and/or orientations thereof thus, with the target held in a fixed position relative to a moving pressure sensitive device and that device having applied to it a fixed dc magnetic field source, the motion of the device produces a variable dc magnetic field at the target. This variable dc magnetic field produces changes in the resonant frequencies which correspond directly to the relative positions of the device to the target. These resonant frequencies are sensed by the receiving coil and can readily be transformed into the desired units of pressure.

Frequency signals like digital signals have less susceptibility to outside noise sources than do analog signals. The present invention provides quasi-digital signal that can be transmittted over longer distances of wire with less signal amplification than that required for transmission of analog signals. Greater signal resolution is also facilitated when using frequency instead of analog signals. The high resolution, high signal-to-noise frequency signal of the present inveniton does not require the special processing equipment used for digital signals, e.g. A/D and D/A converters.

In use of the invention, a mechanical quantity (displacement and/or rotation of a pressure sensitive device) is transduced into an electrical signal by use of the $\Delta E$ effect on the strip. This electrical signal is manifested by resonant frequency shifts resulting from a change in strength of a dc magnetic field. In this manner, a measurement of pressure via displacement and/or rotation of a pressure sensitive device can be represented directly by a frequency change that provides a signal capable of being transmitted substantial distances without the need of intermediate amplification. Moreover, since variation of the dc magnetic field is a function of rotation and or displacement of the pressure sensitive device, pressure can be measured via curvilinear and angular displacements of pressure sensitive devices. As a result the magnetomechanical transducer system of this invention measures displacements and angles in an efficient, economical manner in many more measuring applications than systems wherein types of displacements are restricted to a single axis in the form of linear or rotational movement.

BRIEF DESCRIPTION OF THE DRAWINGS

The invention will be more fully understood and further applications will become apparent when reference is made to the following detailed description of the preferred embodiment of the invention and the accompanying drawings in which:

FIG. 6 is a block diagram of a self-oscillating system incorporating the transducer system of FIG. 1;

FIG. 7 is a block diagram of a white noise system incorporating the transducer system of FIG. 4 and;

DESCRIPTION OF THE PREFERRED EMBODIMENTS

The target of the magnetomechanical transducer system can be fabricated in a number of diverse sizes and configurations. As a consequence, the invention will be found to function in many varieties of measuring applications. For illustrative purposes the invention is described in connection with pressure measurement via displacement of a bourdon tube type pressure sensitive device. It will be readily appreciated that the invention can be employed for similar and yet diversified uses, such as angle and deflection measurements, wherein alterations in the magnetic bias field strength are correlated with the angle or deflection of a pressure sensitive device. Accordingly, the invention is intended to encompass those modifications of the preferred embodiments wherein information concerning the position of a pressure sensitive device is derived from variations in the dc bias field produced by a target attached thereto.

Figure 1:
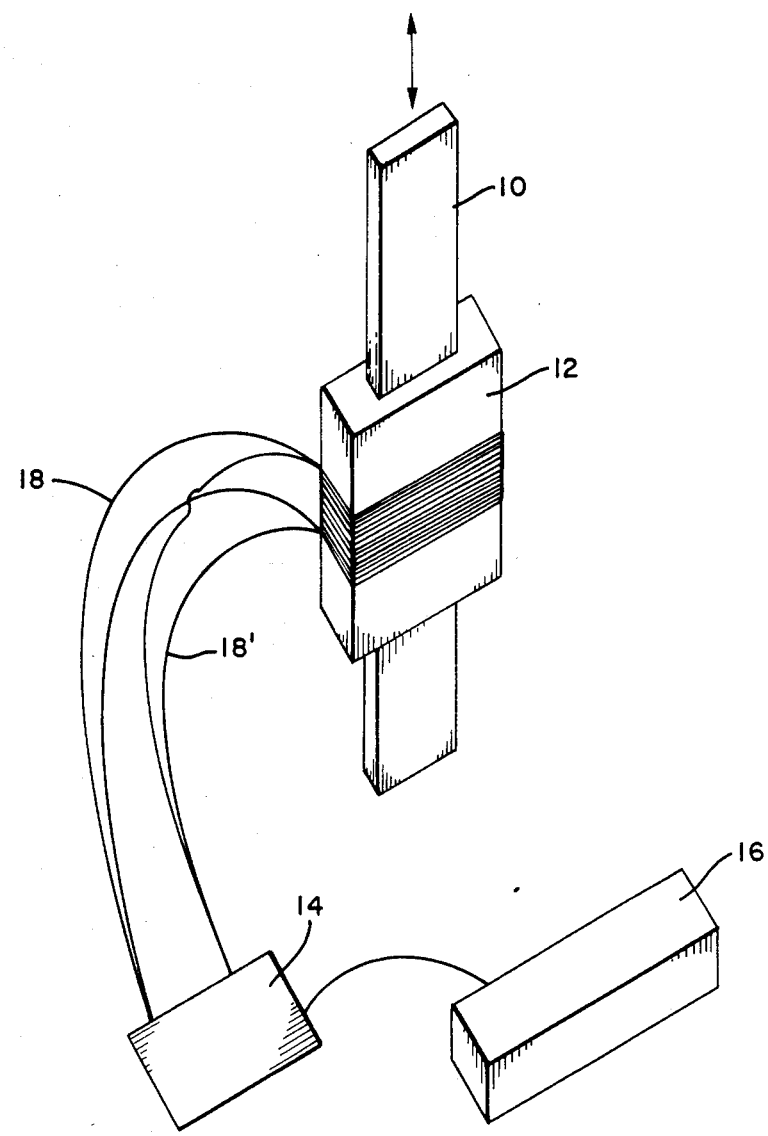
FIG. 1 is an isometric view of a transducer system in which a ferrimagnetic channel is the source of magnetic bias field.
Figure 2:
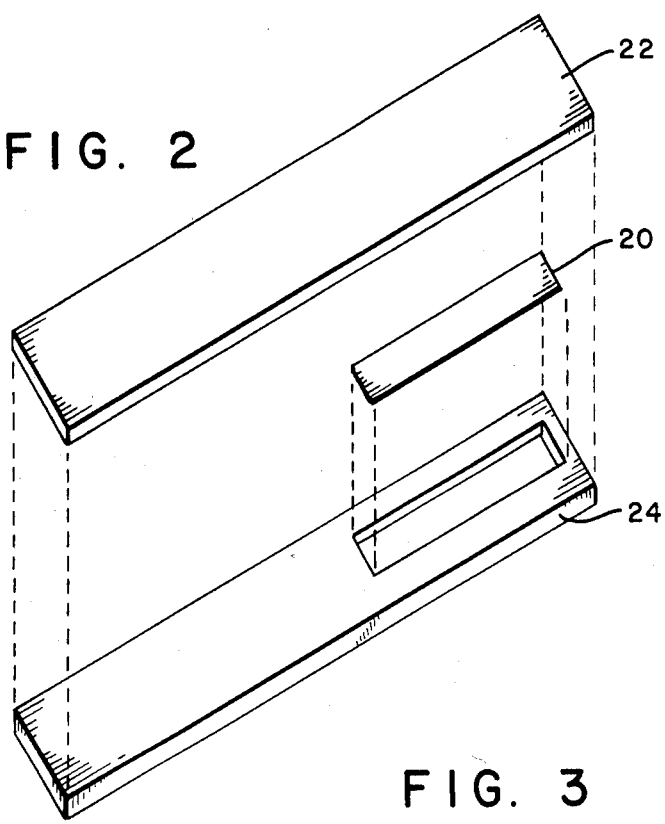
FIG. 2 is an isometric view of target components adapted for use in the system of FIG. 1.
Figure 3:
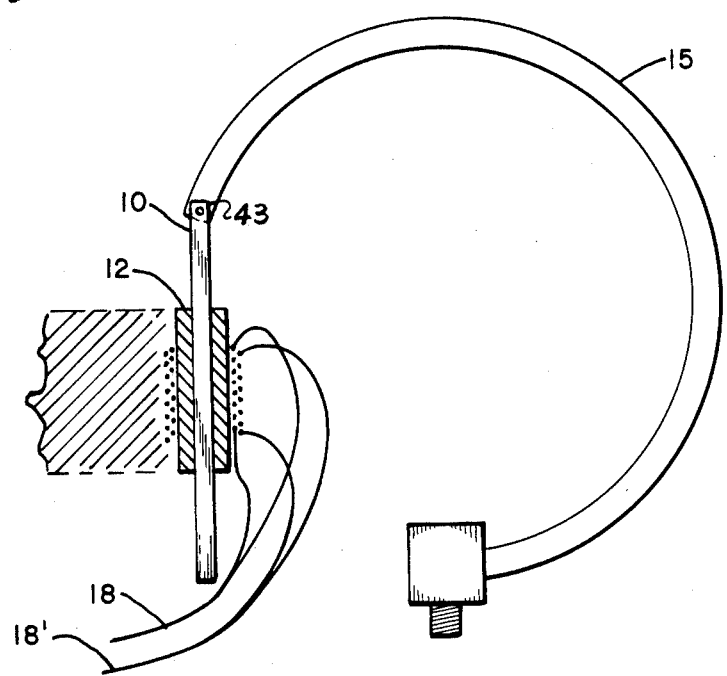
FIG. 3 is a cross section view of a pressure transducer system utilizing a bourdon tube pressure sensitive device along with the system of FIG. 1.
Figure 4:
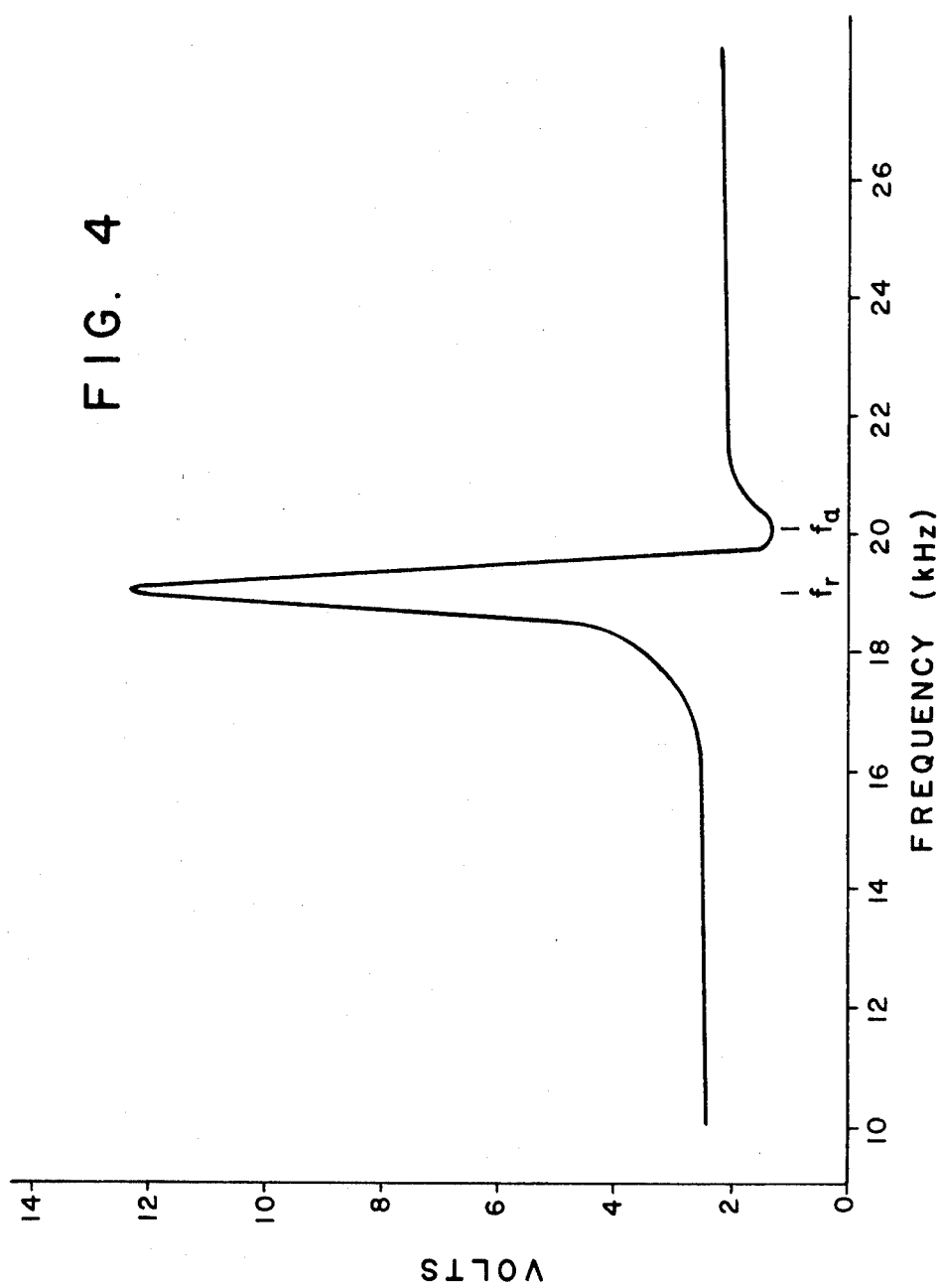
FIG. 4 is a graph showing the voltage induced by magnetomechanical energy exchange of a transducer system over a preselected frequency range.

Referring to FIGS. 1, 2, and 3 of the drawings there is shown a transducer system incorporating a target 10 composed of an amorphous magnetostrictive ribbon which is enclosed within a channel of ferrimagnetic material 12 and two co-axial coils 18 and 18'. The system is activated by a self-oscillating circuit 14 and the resonant frequency is displayed via a counter 16. The target 10 is comprised of an elongated ductile strip 20 of amorphous magnetostrictive ferromagnetic material enclosed within a container composed of polymeric material, such as polyethylene, consisting of two parts: a boat 24 and a cover 22. The container must be constructed in such a manner that the elongated ductile strip 20 remains undamped or free to vibrate upon being placed in the boat 24 and enclosed by the cover 22. This can be accomplished by leaving 1 mm clearance on all inside dimensions. In FIG. 1 the ferrimagnetic channel 12 and the coils 18 and 18' are taken to be fixed or stationary relative to a displaceable object (not shown). The magnetized ferrimagnetic channel 12 can be constructed from a composite of barium-ferrite powder and a plastic such as polyester. The amount of ferrite required depends on the quantity of amorphous strip enclosed. For example a 1 mil thick ⅛ inch wide ribbon typically has a ferrite/plastic weight ratio of 25% to 30%. The target 10 is directly linked to the free end of a bourdon tube 15 and the channel is so constructed that the target slides within the channel (of ferrimagnetic material 12) in a longitudinal direction thereof, as shown by the arrow in FIG. 1, as the bourdon tube 15 is displaced by pressure. When the target 10 is triggered, its mechanical resonant frequency serves as the reference frequency of the self-oscillating circuit 14. The channel of ferrimagnetic material 12 upon being magnetized provides a dc bias field whose effective strength falls off with increasing distance from the channels 12 exits 11 and 13. Thus as the target 10 slides through the channel 12, the effective bias field changes, which, in turn, creates a change in the Youngs modulus of the strip 20 due to the coupling between Young's Modulus and magnetic field strength of amorphous magnetostrictive ferromagnetic material (ΔE effect). This in turn alters the resonant frequency of the strip 20 and thus the reference frequency of the self-oscillating circuit 14. Due to the symmetry of this transducer system, equal outputs are recorded for equivalent displacements of the strip 20 from the channel 12 exits, which doubles the transducer's range. The strip 20 has a magnetomechanical coupling factor, k, greater than 0, where $k=\sqrt{(1-fr^2/fa^2)}$, fr and fa being the resonant and anti-resonant frequencies respectively (shown in FIG. 4 as fr and fa). For example, the fr of a 2 inch strip of as-cast $Fe_{78}Si_9B_{13}$ is 40 kHz, fa is 42.7 kHz thus k is 0.35.

The self-oscillating circuit 14 (FIG. 6) may be triggered mechanically (as one would a tuning fork) or electrically, with white noise or other signals that include the natural resonant frequency of the target 10. The circuit shown in FIG. 6 consists of a start circuit 19, an amplifier 15 and a filter 17 connected to the two coils 18 and 18' surrounding the channel 12. Once the target 10 is triggered the targets response is sent via the receiving coil to the amplifier 14. There the response is amplified and filtered to eliminate noise, then sent to the driving or interrogating coil 18. The resonant frequency output is substantially larger than any coexisting signal. Thus by proper choice of the selectivity of the circuit, only the resonant frequency is amplified. The self-oscillating circuit 14 will remain oscillating at this frequency until the resonant frequency of the target is altered. Thus the circuit 14 will track and oscillate at the same frequency as the resonant frequency of the target 10. The resonant frequency may be directly displayed on a simple counter 16 via the signals from either coil 18 or 18'. From the counter display the frequency can be correlated and transformed into the desired units of pressure.

In accordance with a preferred embodiment of the invention, target 10 is composed of a magnetostrictive amorphous metal alloy. The target is in the form of an elongated, ductile strip having a first component composed of a composition consisting essentially of the formula $M_aN_bO_cX_dY_eZ_f$, where M is at least one of iron and cobalt, N is nickel, O is at least one of chromium and molybdenum, X is at least one of boron and and phosphorous, Y is silicon, Z is carbon, "a"–"f" are in atom percent, "a" ranges from about 35–85, "b" ranges from about 0–45, "c" ranges from about 0–15 and "f" ranges from about 0–2, and the sum of d+e+f ranges from about 15–25.

It has been found that a strip of material having the formula specified above is particularly adapted to resonant mechanically at a preselected frequency of an incident magnetic field. While we do not wish to be bound by any theory, it is believed that, in targets of the aforesaid composition, direct magnetic coupling between an ac magnetic field and the target 10 occurs by means of the following mechanism.

When a ferromagnetic material such as an amorphous metal ribbon is in a magnetic field (H), the ribbon's magnetic domains are caused to grow and/or rotate. This domain movement allows magnetic energy to be stored, in addition to a small amount of energy which is lost as heat. When the field is removed, the domains return to their original orientation releasing the stored magnetic energy, again minus a small amount of energy lost as heat. Amorphous metals have high efficiency in this mode of energy storage, because they have no grain boundaries and have high resistivities.

When the ferromagnetic ribbon is magnetostrictive, an additional mode of energy storage is also possible. In the presence of a magnetic field, a magnetostrictive amorphous metal ribbon will have energy stored magnetically as described above but will also have energy stored mechanically via magnetostriction. This mechanical energy per unit volume stored can be quantified as $U_e=(½)TS$ where T and S are the stress and stain on the ribbon. This additional mode of energy storage may be viewed as an increase in the effective magnetic permeability of the ribbon.

When an ac magnetic field and a dc field are introduced on the magnetostrictive ribbon (such as can be generated by an ac and dc electric currents in a solenoid), energy is alternately stored and released with the frequency of the ac field. The magnetostrictive energy storage and release are maximal at the material's mechanical resonance frequency and minimal at its anti-resonance. This energy storage and release induces a voltage in a pickup coil via flux density changes in the ribbon. The flux density change may also be viewed as an increase in effective magnetic permeability at the resonance frequency and a decrease at anti-resonance, thus, in effect, increasing or decreasing, respectively, the magnetic coupling between the driving solenoid and a second pickup solenoid. The voltage induced by the purely magnetic energy exchange is linear with frequency and the change in voltage with frequency is small over a limited frequency range. The voltage induced by the mechanical energy exchange is also linear with frequency except near mechanical resonance. For a thin ribbon the mechanical resonance frequency is given by:

$$Fr=(½L)(E/D)^{½}$$

where L, E and D are the length, Young's modulus and mass density of the ribbon. Therefore, when the frequency of the ac magnetic field is swept around, fr, a characteristic signature is generated. The resonance peak is closely followed by an anti-resonance peak shown in FIG. 4. This anti-resonant peak occurs when the mechanical energy stored is near zero.

The transfer of magnetic and mechanical energy described above is called magnetomechanical coupling (MMC), and can be seen in all magnetostrictive materials. The efficiency of this energy transfer is proportional to the square of the magnetomechanical coupling factor (k), and is defined as the ratio of mechanical to magnetic energy. Phenomenologically, k is defined as $k=\sqrt{(1-fr^2/fa^2)}$ where fr and fa are the resonant and anti-resonant frequencies described above. The larger the k factor, the greater the voltage difference between resonant peak and anti-resonant valley. Also, the larger the k, the larger the difference in frequency between resonance and antiresonance. Therefore, a large k facilitates the observation of the MMC phenomena. A large k also insures a large ΔE effect.

Coupling factors are influenced in a given amorphous metal by the level of bias field present, the level of internal stress (or structural anisotropy) present and by the level and direction of any magnetic anisotropy. Annealing an amorphous metal relieves internal stresses, thus permitting enhanced k values. The structural anisotropy is small due to the ribbon's amorphous nature, also enhancing k. Annealing in a properly oriented magnetic field can significantly enhance coupling factors. Domain movement can be maximized when the ribbon has a interrogating field. Because of demagnetizing field effects, it is practical to interrogate the ribbon only along its length (this being the longest dimension). Therefore, the induced magnetic anisotropy should be transverse to the long dimension of the ribbon.

Maximum values of k are obtained by annealing the ribbon in a saturating magnetic field which is perpendicular to ribbon length (cross-field annealed). For a ½ inch wide ribbon, a field of a few hundred oersteds is required. The optimum time and temperature of the anneal depends on the alloy employed. As an example, an iron-boron-silicon alloy yields an optimum coupling (k=0.90) when cross-field annealed at 400° C. for 30 minutes. This anneal yields an optimum resonant frequency range with the bias field centered around 1 Oe. For alloys having the compositions specified hereinabove, the annealing temperature ranges from about 300° to 450° C. and the annealing time ranges from about 7 to 120 min.

The anneal also affects the bias field required to optimize k. For a given amorphous metal with a given anneal, the coupling depends strongly on the bias field. At zero and saturating fields, the coupling is zero (no resonant and anti-resonant phenomena). For a given alloy, an optimum bias field exists which yields a maximum k. For alloys having the compositions specified herein, the bias field required to optimize k ranges from about 0.1 to 20 Oe.

Even though most magnetostrictive materials will exhibit some MMC, amorphous metal yield extremely high coupling factors, and are, therefore highly preferred. As-cast amorphous metals yield higher k than most other magnetostrictive materials. No material has higher k than amorphous metals when cross-field annealed. Amorphous metals have high k because they have: (a) low magnetic losses (no grain boundaries, high resistivity), (b) low structural and stress anisotropy, (c) reasonable magnetostriction and (d) an ability to be given a beneficial magnetic anisotropy.

Amorphous metal alloys make good targets because (a) they have high k—even as-cast, (b) they are mechanically strong, tough and ductile in bending, (c) they require low bias fields and (d) they have extremely high magnetostrictivity (they develop a large force upon resonating and are, therefore, more difficult to damp out). It will be appreciated, therefore, that the amorphous metals of which the target of this invention is composed need not be annealed, but may be incorporated into the target as-cast.

Examples of amorphous ferromagnetic target compositions in atomic percent within the scope of the invention are set forth below in Table 1.

TABLE 1

| ALLOY | AS-CAST k | OPTIMAL ANNEALED k | OPTIMAL ANNEALED ΔE |
|---|---|---|---|
| $Fe_{78}Si_9B_{13}$ | 0.35 | 0.90 | 350% |
| $Fe_{79}Si_5B_{16}$ | 0.31 | 0.90 | 340% |
| $Fe_{81}B_{12.5}Si_{3.5}C_2$ | 0.22 | 0.90 | 300% |
| $Fe_{67}Co_{18}B_{14}Si_1$ | 0.45 | 0.72 | 120% |
| $Fe_{40}Ni_{38}Mo_4B_{18}$ | 0.23 | 0.50 | 100% |

Common crystalline materials, such as annealed Ni have k's of 0.38 and ΔE's of 30%. More exotic crystalline materials, such as annealed TbDyFe alloys, have k's as high as 0.55 and ΔE's of 150%. This last material is expensive, brittle and rquires magnetic bias fields in excess of 4000 Oe. The amorphous alloys listed above all require bias fields of 12 Oe or less. Most amorphous alloys require less than 1 Oe.

The amorphous ferromagnetic metal target of the invention is prepared by cooling a melt of the desired composition at a rate of at least about 10⁵°C./sec, employing metal alloy quenching techniques well-known to the amorphous metal alloy art; see, e.g., U.S. Pat. No. 3,856,513 to Chen et al. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be amorphous, in which case there in no long-range order. X-ray diffraction patterns of amorphous alloys must be at least 50% amorphous to be sufficiently ductile to permit subsequent handling, such as stamping complex target shapes from ribbons of the alloys without degradation of the targets signal identity. Preferably, the amorphous metal target must be at least 80% amorphous to attain superior ductility.

The metastable phase may also be a solid solution of the constituent elements. In the case of the target of the invention, such metastable, solid solution phases are not ordinarily produced under conventional processing techniques employed in the art of fabrication crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile in bending when produced under the conditions described above.

The magnetostrictive strip 20 of which target 10 is comprised is advantageously produced in foil (or ribbon) form, and may be used in transducer applications as cast, whether the material is amorphous or a solid solution. Alternatively, foils of amorphous metal alloys may be heat treated to obtain a crystalline phase, preferably fine-grained, in order to promote longer die life when stamping of complex target shapes is contemplated.

The amorphous ferromagnetic material of strip 20 is exceedingly ductile in bending. By ductile is meant that the strip 20 can be bent around a radius as small as ten times the foil thickness without fracture. Such bending of the strip 20 produces little or no degradation in magnetic properties generated by the target upon application of the interrogating magnetic field thereto. As a result, the target retains its sensitivity despite being flexed or bent during (1) manufacture (e.g., cutting, stamping or otherwise forming the strip 20 into the desired length and configuration), (2) installation and (3) operation.

Figure 5:
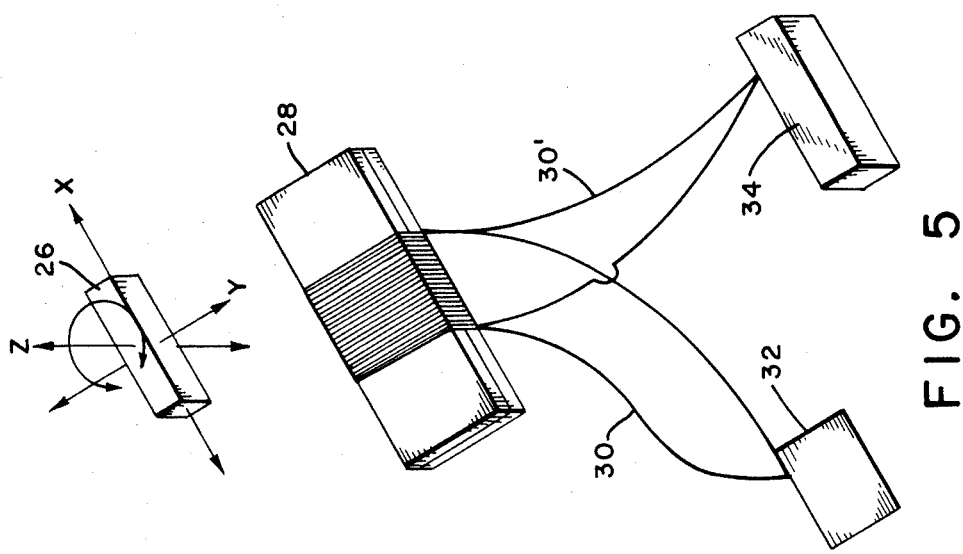
FIG. 5 is an isometric view of a transducer system in which a bar magnet is the source of the magnetic bias field.
Figure 8:
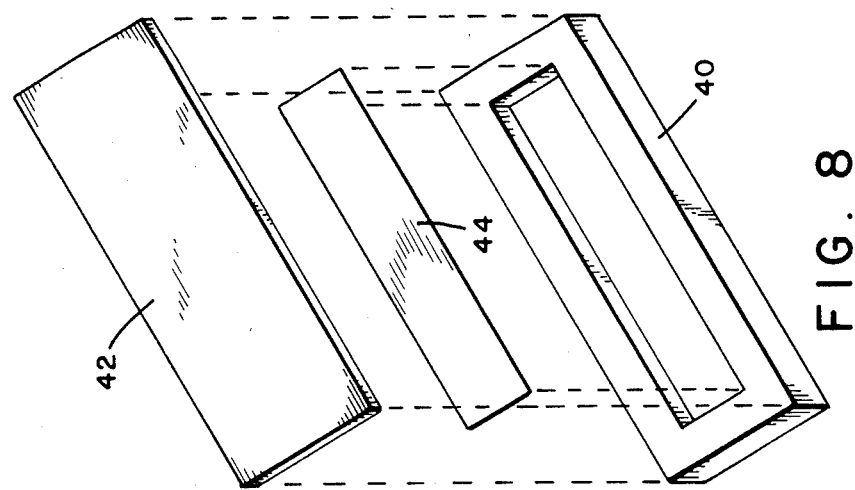
FIG. 8 is an isometric view of target components adapted for use in the system of FIG. 4.
Figure 9:
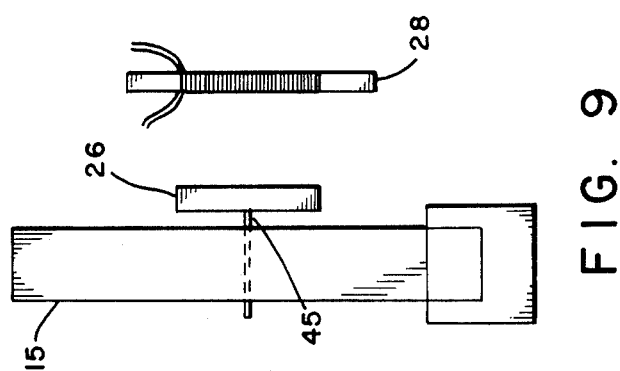
FIG. 9 is a side view of the bourdon tube pressure sensitive device shown in FIG. 5, depicting an alternative arrangement of the bar magnet.

Referring to FIG. 5 of the drawings there is shown an alternate transducer system incorporating a target 28 wrapped by two coils 30 and 30' within the effective bias field of a moveable ferromagnetic bar 26. The system is activated by a white noise generating circuit 32 (FIG. 7) with the resonant frequency being displayed via a counter 34. The self-oscillating circuit of FIG. 7 can alternately be used in place of the white noise circuit. The target 28 in FIG. 5 is similar to the target 10 of FIG. 1 with the exception that the extension on the container is not required in this system. A detailed drawing of target 28 is shown in FIG. 8. As shown, target 28 includes a boat 40, cover 42 and elongated, ductile strip 44. In FIG. 5 the ferromagnetic bar 26 may be a polar magnet mounted on a support (such as the free end 43 of a bourdon tube 15, shown in FIG. 3, or the needle 45 on an analog gage) for movement relative to said target 28 (see FIG. 9) in one or more of the indicated directions X, Y, or Z shown in FIG. 5 to thereby produce a change in the effective bias field experienced by the target 28. Accordingly any size or shape of ferrimagnetic or ferromagnetic materials may be applied as the bias field source, provided the magnet has a single pair of magnetic poles. In the transducer application the magnet may be directly attached to a movable pressure sensitive device or the device itself when physically possible could be magnetized.

The white noise circuit 32 of FIG. 7 includes a noise generator 31, a band pass filter 33 and an amplifier 35. Circuit 32 provides a continuous interrogation signal covering a close banded uniform spectrum of frequencies including the resonant frequency of the target 28. The output, from target 28, via the receiving coil 30 reveals the same spectrum of white noise with the exception of the resonant frequency of the target 28. At the resonant frequency, a sharp signal appears which is markedly greater in amplitude than the noise signal. Thus it is a simple matter to adjust the sensitivity of a simple counter 34 in order to display the resonant frequency. Alternatively the two signals, the input (noise) and the output (noise plus resonant frequency), may be subtracted from each other producing a remainder of just the resonant frequency.

Having thus described the invention in rather full detail, it will be understood that such detail need not be strictly adhered to but that various changes and modifications may suggest themselves to one skilled in the art, all falling within the scope of the invention.

What we claim is:

1. A magnetomechanical-resonant-frequency pressure transducer system responsive to the strength of a d.c. bias field on a target, comprising:

a. means including a driving coil co-axial with said target for interrogating said target, b. generating means for generating an a.c. magnetic field within said coil to effect direct magnetic coupling between said ac magnetic field and said target, said ac magnetic field incorporating the resonant frequency of said target;

c. means including a displaceable pressure sensitive device biasing means for generating said dc bias field and varying means for changing the relative displacement of said pressure sensitive device and said target so as to vary the strength of said dc bias field on said target, thereby applying a variable d.c. bias field to said target to produce changes in the resonant frequency of said target that are correlated with displacement of said pressure sensitive device; and d. detection means for detecting the resonant frequency produced in said target by the strength of said dc bias field.

2. A resonant-frequency transducer system as recited in claim 1, wherein said generation means includes the use of a self-oscillating circuit having a reference frequency equal to the resonant frequency of said target.

3. A resonant-frequency transducer system as recited in claim 1, wherein said generation means includes energizing means adapted to provide said interrogation coil with a white noise source comprising a uniform closely banded spectrum of ac magnetic fields incorporating the resonant frequency of said target.

4. A resonant-frequency transducer system as recited in claim 1, wherein said means for applying a variable d.c. bias field includes means for slideably displacing said target within a channel of ferrimagnetic material.

5. A resonant-frequency transducer system as recited in claim 1 wherein said means for applying a variable dc bias includes means for slideably displacing said target within a channel of ferromagnetic material.

6. A resonant-frequency transducer system as recited in claim 1, wherein said means for applying variable d.c. bias field includes a bar magnet adapted to generate a dc bias field, said bar magnet being mounted on a support in the proximity of said target for movement relative to said target to vary the strength of the dc bias field applied thereto.

7. A resonant-frequency transducer system as recited in claim 6, wherein said pressure sensitive device is a bourdon tube and said support on which said bar magnet is mounted comprises the free end of said bourdon tube.

8. A resonant-frequency transducer system as recited in claim 6, wherein said magnet bar is mounted for rotation about the X, Y or Z axes thereof.

9. A resonant-frequency transducer system as recited in claim 1, wherein said means for detection of said target's resonant frequency includes a counter having variable sensitivity and a receiving coil surrounding said target.

10. A resonant-frequency transducer system as recited in claim 1, wherein said means for applying a variable dc bias field comprises a barium-ferrite channel adapted, when magnetized, to provide said the dc bias field.

11. A resonant-frequency transducer system as recited in claim 1, wherein said target comprises an elongated, ductile strip of magnetostrictive ferromagnetic material enclosed in a non-magnetic container in such a manner as to allow the strip to vibrate freely, said strip having a magnetostrictive coupling factor, k greater than 0, where $k=\sqrt{(1-fr^2/fa^2)}$, fr and fa being the resonant and anti-resonant frequencies, respectively.

12. A resonant-frequency transducer system as recited in claim 10, wherein said barium-ferrite channel has a ferrite/plastic weight ratio of 0.25 to 0.30.

13. A resonant-frequency transducer system as recited in claim 12, wherein said channel is so constructed that said target is slidable therewithin for movement longitudinal thereof.

* * * * *